(12) United States Patent
Seki

(10) Patent No.: US 11,796,004 B2
(45) Date of Patent: Oct. 24, 2023

(54) SEALING DEVICE

(71) Applicant: NOK CORPORATION, Tokyo (JP)

(72) Inventor: Masahiro Seki, Fukushima (JP)

(73) Assignee: NOK CORPORATION, Tokyo (JP)

( * ) Notice: Subject to any disclaimer, the term of this patent is extended or adjusted under 35 U.S.C. 154(b) by 54 days.

(21) Appl. No.: 17/611,245

(22) PCT Filed: Apr. 24, 2020

(86) PCT No.: PCT/JP2020/017593
§ 371 (c)(1),
(2) Date: Nov. 15, 2021

(87) PCT Pub. No.: WO2020/250579
PCT Pub. Date: Dec. 17, 2020

(65) Prior Publication Data
US 2022/0213931 A1      Jul. 7, 2022

(30) Foreign Application Priority Data
Jun. 12, 2019   (JP) .................................. 2019-109678

(51) Int. Cl.
*F16C 33/80* (2006.01)
*F16C 19/18* (2006.01)
(Continued)

(52) U.S. Cl.
CPC .......... *F16C 33/805* (2013.01); *F16C 19/186* (2013.01); *F16C 33/7879* (2013.01); *F16J 15/3232* (2013.01); *F16C 2326/02* (2013.01)

(58) Field of Classification Search
CPC .... F16J 15/00; F16J 15/16; F16J 15/50; F16J 15/52; F16J 15/32; F16J 15/3204;
(Continued)

(56) References Cited

U.S. PATENT DOCUMENTS 9,102,196 B2 * 8/2015 Sanaka .................. F16C 33/768
2018/0195558 A1 * 7/2018 Kato ...................... F16J 15/3264

FOREIGN PATENT DOCUMENTS

DE        10125253 A1    12/2001
DE    102004001070 A1    7/2004
(Continued)

OTHER PUBLICATIONS

International Search Report issued in International Bureau of WIPO Patent Application No. PCT/JP2020/017593, dated Jun. 16, 2020.
(Continued)

*Primary Examiner* — Nathan Cumar
(74) *Attorney, Agent, or Firm* — GREENBLUM & BERNSTEIN, P.L.C.

(57) ABSTRACT

A sealing device adapted to be disposed between an inner member and an outer member that rotate relative to each other includes a first sealing member including a cylindrical part adapted to be mounted to the outer member, and an annular part that extends radially inward from the cylindrical part; and a second sealing member including a sleeve adapted to be mounted to the inner member, and a flange. The first sealing member includes a lip that extends toward the flange of the second sealing member. An annular first clearance is provided between the flange and the cylindrical part of the first sealing member. The second sealing member includes a labyrinth lip extending from the flange radially outward and extending toward the atmosphere side more than the cylindrical part of the first sealing member, and a second clearance is provided between the labyrinth lip and the outer member.

7 Claims, 9 Drawing Sheets

(51) Int. Cl.
*F16C 33/78* (2006.01)
*F16J 15/3232* (2016.01)

(58) Field of Classification Search
CPC .... F16J 15/3216; F16J 15/322; F16J 15/3224; F16J 15/3232; F16J 15/3236; F16C 33/00; F16C 33/80; F16C 33/805; F16C 33/76; F16C 33/761; F16C 33/78; F16C 33/7869; F16C 33/7879; F16C 19/00; F16C 19/186; F16C 19/187; F16C 2326/00; F16C 2326/02
USPC .......................................................... 277/351
See application file for complete search history.

(56) References Cited

FOREIGN PATENT DOCUMENTS

| DE | 102012204620 A1 | 9/2013 | | |
|---|---|---|---|---|
| EP | 2693068 A1 | 2/2014 | | |
| JP | 2-66721 U | 5/1990 | | |
| JP | 11-210684 | 8/1999 | | |
| JP | 2005-331002 | 12/2005 | | |
| JP | 2012-207769 | 10/2012 | | |
| JP | 2014-234851 | 12/2014 | | |
| JP | 2016-80020 | 5/2016 | | |
| JP | 2017-223257 | 12/2017 | | |
| JP | 2018-54024 | 4/2018 | | |
| WO | 2015/064400 A1 | 5/2015 | | |
| WO | WO-2015064400 A1 * | 5/2015 | ............ | F16C 33/782 |
| WO | 2017/061242 | 4/2017 | | |

OTHER PUBLICATIONS

Extended European Search Report issued in European Patent Application No. 20822371.9 dated Jun. 9, 2022.
Japan Official Action received in JP Application No. 2021-525934, dated Dec. 6, 2022.

* cited by examiner

SEALING DEVICE

TECHNICAL FIELD

The present invention relates to sealing devices.

BACKGROUND ART

Rolling bearings, such as ball bearings are well known and are used, for example, in automotive vehicle hubs. Patent Document 1 discloses a sealing device that seals an inside of a rolling bearing. The sealing device includes a mounted ring press-fitted into the outer race of the rolling bearing, a seal ring integrally attached to the mounted ring, and a slinger mounted to the inner race, in which multiple lips formed at the seal ring are brought into contact with the slinger. The lips have a function of sealing lubricant (grease) inside the bearing and a function of sealing to prevent foreign matter, such as water and dust from ingress into the inside of the bearing.

BACKGROUND DOCUMENT(S)

Patent Document(s)

Patent Document 1: JP-A-2005-331002

SUMMARY OF THE INVENTION

For this type of sealing device, there is a demand to improve the function of protecting against water (including muddy water or salt water) from entering the inside of the sealed object (e.g., bearing) if the sealing device is used in an environment with a lot of water. It is also desirable for water to be discharged rapidly even if water does enter the sealing device.

Accordingly, the present invention provides a sealing device that has superior ability to discharge foreign matter and superior ability to protect the sealed object from foreign matter.

In accordance with an aspect of the present invention, there is provided a sealing device adapted to be disposed between an inner member and an outer member that rotate relative to each other, and adapted to act to seal a gap between the inner member and the outer member. The sealing device includes: a first sealing member including a cylindrical part adapted to be mounted to the outer member, and an annular part that extends radially inward from the cylindrical part toward the inner member; and a second sealing member including a sleeve adapted to be mounted to the inner member, and a flange that extends radially outward from the sleeve, the flange facing the annular part of the first sealing member. The first sealing member further includes at least one lip made of an elastic material that extends toward the flange of the second sealing member. An annular first clearance is provided between the flange and the cylindrical part of the first sealing member. The second sealing member further includes a labyrinth lip extending from the flange radially outward and extending toward the atmosphere side more than the cylindrical part of the first sealing member, and a second clearance is provided between the labyrinth lip and the outer member. The second clearance is radially outside the first clearance and communicates with the first clearance.

In this aspect, foreign matter may enter the space between the annular part of the first sealing member and the flange of the second sealing member through the first clearance between the flange and the cylindrical part. However, the labyrinth lip, which extends from the flange radially outward and extends toward the atmosphere side more than the cylindrical part of the first sealing member, covers the first clearance. Accordingly, the labyrinth lip prevents foreign matter from entering the space. Since the second clearance is provided between the labyrinth lip and the outer member, even if foreign matter enters the first clearance and/or space, the foreign matter will be discharged through the second clearance.

DESCRIPTION OF EMBODIMENTS

Hereinafter, with reference to the accompanying drawings, embodiments according to the present invention will be described. It is of note that the drawings are not necessarily to scale, and certain features may be exaggerated or omitted.

Figure 1:
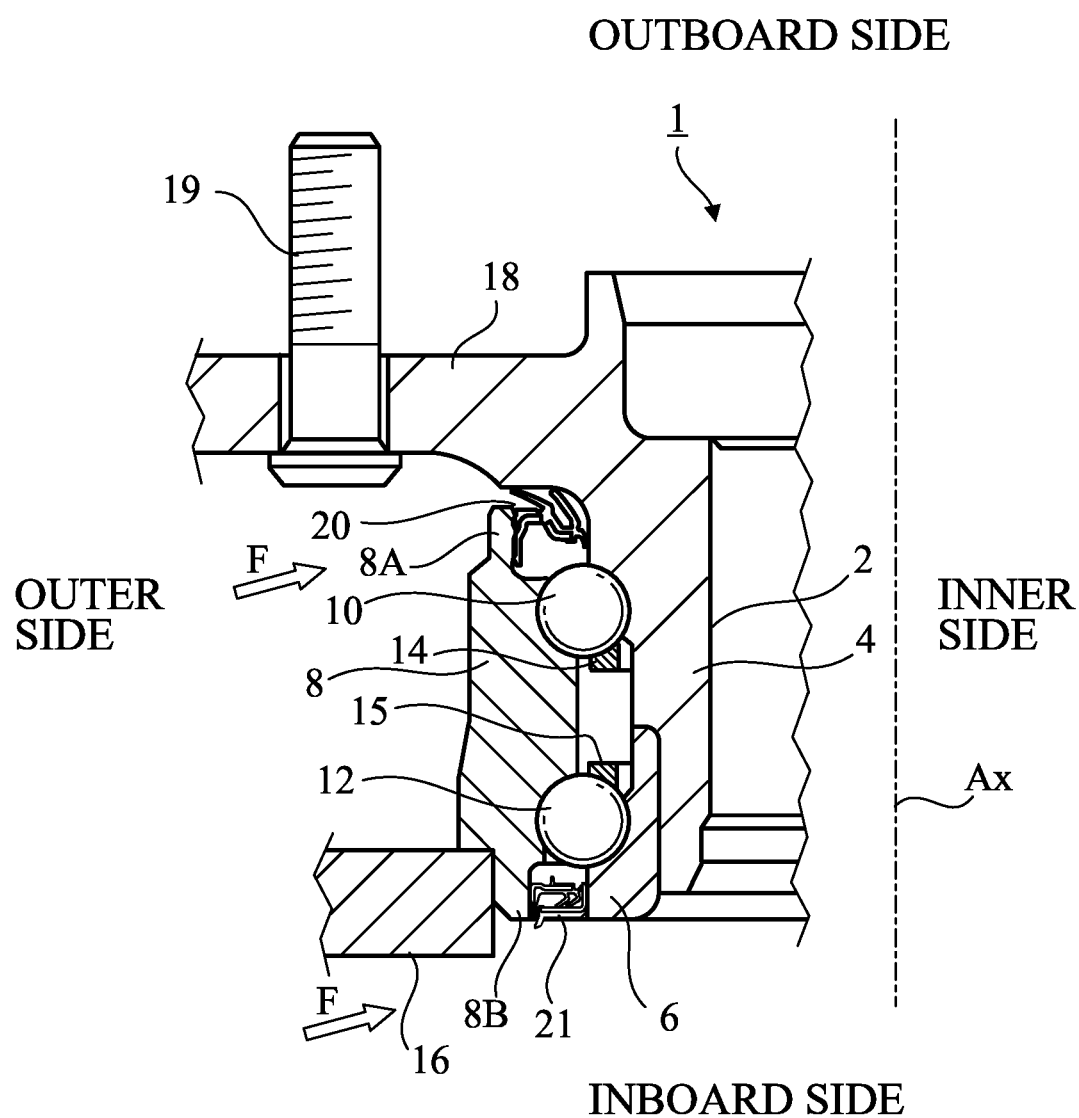
FIG. 1 is a partial cross-sectional view of an example of a rolling bearing in which a sealing device according to an embodiment of the present invention is used.

FIG. 1 shows an automotive vehicle hub bearing, which is an example of a rolling bearing in which a sealing device according to any one of the embodiments of the present invention is used. The present invention is not limited to hub bearings, and is applicable to other types of rolling bearings. In the following description, the hub bearing is a ball bearing. Again, the present invention is not limited to ball bearings, and is applicable to other types of rolling bearings, such as roller bearings and needle bearings, and other types of rolling elements. The present invention is also applicable to rolling bearings used in machines other than automotive vehicles.

The hub bearing 1 includes a hub 4 (inner member) that has a hole 2 into which a spindle (not shown) is inserted, an inner race 6 (inner member) mounted to the hub 4, an outer race 8 (outer member) located outside the hub 4 and the inner race 6, multiple balls 10 arranged in a row between the hub 4 and the outer race 8, multiple balls 12 arranged in a row between the inner race 6 and the outer race 8, and multiple retainers 14 and 15 that retain the balls in place.

Whereas the outer race 8 remains stationary, the hub 4 and the inner race 6 rotate with the spindle.

In FIG. 1, the central axis Ax common to the spindle and hub bearing 1 extends in a vertical direction. In FIG. 1, relative to the central axis Ax only the left part is shown; and although not shown in detail, in FIG. 1 the upper side corresponds to the outer side (outboard side) of the automotive vehicle on which wheels are arranged, while the lower side corresponds to the inner side (inboard side) on which differential gears are arranged. In FIG. 1, the outer side and the inner side are shown in their respective radial directions.

The outer race 8 of the hub bearing 1 is mounted to the hub knuckle 16. The hub 4 has an outboard side flange 18 that extends radially further outward than the outer race 8. A wheel can be mounted to the outboard side flange 18 by hub bolts 19.

A sealing device 20 that seals a gap between the outer race 8 and the hub 4 is located close to the end of the outer race 8 on the outboard side, and inside the end of the outer race 8 on the inboard side. Another sealing device 21 that seals a gap between the outer race 8 and the inner race 6 is located inside the end of the inner side of the outer race 8. The sealing devices 20 and 21 prevent outflow of a lubricant in the form of grease from the interior of the hub bearing 1, and prevent intrusion of foreign matter (water, including muddy water and salt water) into the interior of the hub bearing 1 from the outside. In FIG. 1, arrows F indicate an example direction of an exterior flow of foreign matter.

The sealing device 20 is located between the rotatable hub 4 and the cylindrical end portion 8A on the outboard side of the stationary outer race 8 of the hub bearing 1, and seals the gap between the outer race 8 and the hub 4. The sealing device 21 is located between the rotatable inner race 6 and the end portion 8B on the inboard side of the outer race 8 of the hub bearing 1, and seals the gap between the outer race 8 and the inner race 6.

Figure 2:
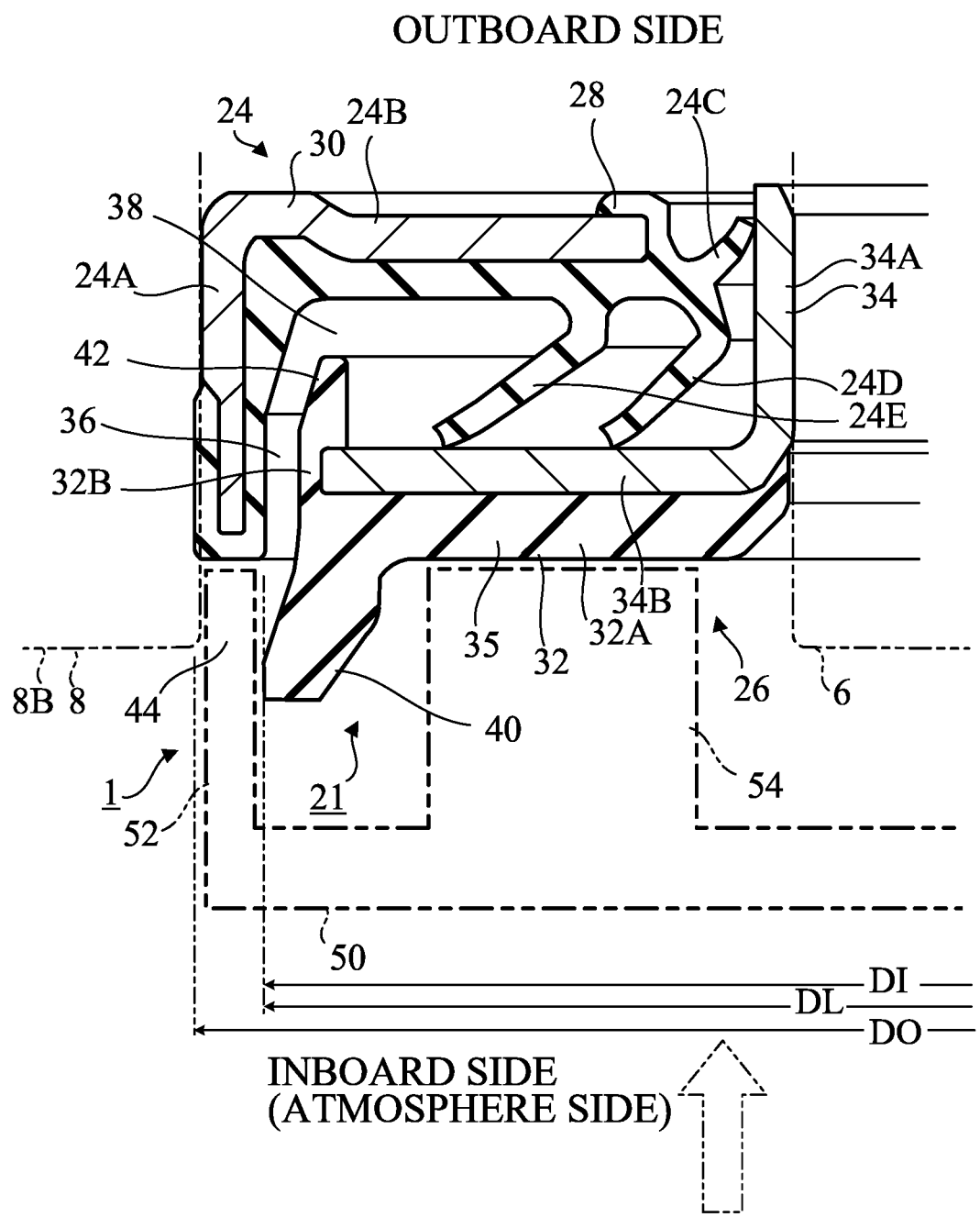
FIG. 2 is a partial cross-sectional view of a sealing device according to an embodiment of the present invention.

As shown in FIG. 2, the sealing device 21 is provided in a gap between the end portion 8B on the inboard side of the outer race 8 of the hub bearing 1 and the inner race 6 of the hub bearing 1. The sealing device 21 is annular in shape; although, in FIG. 2 only the left part of the sealing device 21 is shown.

The sealing device 21 has a composite structure that includes a first sealing member 24 and a second sealing member 26.

The first sealing member 24 is a stationary sealing member that is mounted to the outer race 8 and does not rotate. The first sealing member 24 has a composite structure and includes an elastic ring 28 and a rigid ring 30. The elastic ring 28 is made of an elastic material such as an elastomer. The rigid ring 30 is made of a rigid material such as a metal and reinforces the elastic ring 28. As viewed in cross section, the rigid ring 30 is substantially L-shaped. A part of the rigid ring 30 is embedded in the elastic ring 28 and is in close contact with the elastic ring 28.

The first sealing member 24 has a cylindrical part 24A, an annular part 24B, a radial lip 24C, and axial lips 24D and 24E. The cylindrical part 24A constitutes a mounted part that is to be mounted to the outer race 8. More specifically, the cylindrical part 24A is engaged by interference fit, namely, is press-fitted into the end portion 8B of the outer race 8. The annular part 24B, which has a circular annular shape, is located radially inside the cylindrical part 24A and extends from the cylindrical part 24A radially inward toward the inner race 6. The cylindrical part 24A and the annular part 24B are formed of the rigid ring 30 and the elastic ring 28.

The radial lip 24C and the axial lips 24D and 24E extend from the annular part 24B toward the second sealing member 26, and the distal ends of these lips are in contact with the second sealing member 26. These lips are formed of the elastic ring 28.

The second sealing member 26 may also be referred to as a slinger, that is, a rotational sealing member. The second sealing member 26 is mounted to the inner race 6, rotates together with the inner race 6, and acts to deflect exterior splashing of foreign matter.

In this embodiment, the second sealing member 26 also has a composite structure that includes an elastic ring 32 and a rigid ring 34. The rigid ring 34 is made of a rigid material such as a metal.

As viewed in cross section, the rigid ring 34 is substantially L-shaped. The rigid ring 34 includes a cylindrical sleeve 34A and an annular flange 34B that extends radially outward from the sleeve 34A. The sleeve 34A constitutes a mounted part that is to be mounted to the inner race 6. More specifically, an end portion of the inner race 6 is engaged by interference fit, namely, is press-fitted into the sleeve 34A.

The flange 34B is located radially outside the sleeve 34A, extends radially outward, and faces the annular part 24B of the first sealing member 24. In this embodiment, the flange 34B is a flat plate and lies on a plane that is perpendicular to the axis of the sleeve 34A.

The elastic ring 32 is in close contact with the flange 34B of the rigid ring 34. In another point of view, the second sealing member 26 includes the sleeve 34A made of only a rigid material, and a flange 35 that extends radially outward from the sleeve 34A and faces the annular part 24B of the first sealing member 24, in which the flange 35 is made of a rigid material and an elastic material.

The flange 35 includes the flange 34B of the rigid ring 34 (rigid portion of the flange 35) and flange portions 32A and 32B of the elastic ring 32 (elastic portions of the flange 35). The elastic portion 32A of the flange 35 is fixedly adhered to the entirety of the surface of the rigid portion 34B that is opposite to the sleeve 34A (inboard side surface), and the elastic portion 32B of the flange 35 extends from the elastic portion 32A to the outboard side and is fixedly adhered to the entirety of the outer peripheral surface of the rigid portion 34B.

The flange portion 32A of the elastic ring 32 is used to measure a rotational speed of the inner race 6. More specifically, the elastic ring 32 is formed of a resin material that contains a magnetic metal powder and a ceramic powder, or an elastomer material that contains a magnetic metal powder and a ceramic powder, and has a large number of S poles and N poles provided by the magnetic metal powder. In the flange portion 32A of the elastic ring 32, a large number of S poles and N poles are alternately arranged at equiangular intervals in a circumferential direction. The angle of rotation of the flange portion 32A of the elastic ring 32 is measured by use of a magnetic rotary encoder (not shown). Since the material of the elastic ring 32 contains a metal powder, it has a higher degree of hardness than that of usual resin materials or elastomer materials and thus is not readily susceptible to damage by foreign matter.

The radial lip (grease lip) 24C of the first sealing member 24 extends radially inward from the inner end of the annular part 24B. The radial lip 24C extends toward the sleeve 34A of the second sealing member 26, and the distal end of the radial lip 24C is in contact with the sleeve 34A. The radial lip 24C extends radially inward and toward the outboard side, and has a primary role in preventing outflow of the lubricant from the inside of the hub bearing 1.

The axial lips (side lips) 24D and 24E of the first sealing member 24 extend laterally from the annular part 24B. The distal ends of the axial lips 24D and 24E extend radially outward toward the inboard side and are in contact with the rigid portion 34B of the flange 35 of the second sealing member 26. Each of the axial lips 24D and 24E has a primary role in preventing exterior intrusion of foreign matter into the hub bearing 1.

The first sealing member 24 is mounted to the stationary outer race 8. On the other hand, the inner race 6 and the second sealing member 26 rotate, and the radial lip 24C and the axial lips 24D and 24E slide on the second sealing member 26.

An annular first clearance 36 is provided between the distal end on the inboard side of the cylindrical part 24A of the first sealing member 24 and the flange 35 of the second sealing member 26. Foreign matter may enter through the first clearance 36 into a space 38 between the annular part 24B of the first sealing member 24 and the flange 35 of the second sealing member 26. Conversely, foreign matter in the space 38 can also be discharged through the first clearance 36.

The second sealing member 26 further has two labyrinth lips 40 and 42.

The labyrinth lip 40 is a truncated-cone shaped ring that extends radially outward and toward the inboard side (atmosphere side) from the flange 35 (especially, the elastic portions 32A and 32B) of second sealing member 26. The labyrinth lip 40 extends more toward the inboard side than the cylindrical part 24A of the first sealing member 24, and an annular second clearance 44 is provided between the labyrinth lip 40 and the outer race 8. The second clearance 44 communicates with the first clearance 36. The second clearance 44 is located radial outside the first clearance 36. In other words, the labyrinth lip 40 covers the first clearance 36 at least partially.

The labyrinth lip 42 is a cylindrical ring that projects from the flange 35 toward the annular part 24B of the first sealing member 24. In this embodiment, the labyrinth lip 42 is located at the outermost edge of the second sealing member 26.

In this embodiment, the labyrinth lip 40 is integrally attached to the elastic portions 32A and 32B of the flange 35, whereas the labyrinth lip 42 is integrally attached to the elastic portion 32B of the flange 35. In other words, the labyrinth lips 40 and 42 are parts of the elastic ring 32. Therefore, the labyrinth lips 40 and 42 are made of the same material as the elastic ring 32, i.e., a resin material containing a magnetic metal powder and a ceramic powder, or an elastomer material containing a magnetic metal powder and a ceramic powder. Since the labyrinth lips 40 and 42 contain a metal powder and a ceramic powder, they have superior durability against impact of hard foreign matter and a superior wear resistance.

In the sealing device 21, foreign matter may enter into the space 38 between the annular part 24B of the first sealing member 24 and the flange 35 of the second sealing member 26 through the first clearance 36 between the flange 35 and the cylindrical part 24A. However, since the first clearance 36 is covered with the labyrinth lip 40, which extends from the flange 35 radially outward and toward the atmosphere side more than the cylindrical part 24A, the ingress of foreign matter into the space 38 is inhibited. Since the second clearance 44 is provided between the labyrinth lip 40 and the outer race 8, even if foreign matter enters the first clearance 36 and/or the space 38, the foreign matter will be discharged through the second clearance 44. In particular, in this embodiment, the second sealing member 26 rotates along with the inner race 6, so that the foreign matter is easily discharged through the second clearance 44 by a centrifugal force.

In addition, the annular labyrinth lip 42 protrudes from the flange 35 toward the annular part 24B of the first sealing member 24. Although the labyrinth lip 42 is not in contact with the first sealing member 24, the labyrinth lip 42 complicates and elongates the path of entry of foreign matter from the first clearance 36 to the space 38. Thus, the ingress of foreign matter into the space 38 is inhibited. The labyrinth lip 42 overlaps the distal ends of the axial lips 24D and 24E in radial directions. Therefore, it is difficult for foreign matter to penetrate between the distal ends of the axial lips 24D and 24E and the rigid portion 34B of the flange 35.

The sealing device 21 is mounted to the gap between the outer race 8 and the inner race 6 by, for example, a mounting jig 50. The arrow depicted by the phantom line in the figure indicates the direction of movement of the mounting jig 50.

The mounting jig 50 is formed of a metal such as a steel, and has coaxial circular annular portions 52 and 54. The end surface of the circular annular portion 52 can be brought into contact with the end surface of the cylindrical part 24A of the first sealing member 24, and the end surface of the circular annular portion 54 can be brought into contact with the elastic portion 32A of the flange 35 of the second sealing member 26.

By means of the mounting jig 50, the first sealing member 24 and the second sealing member 26 of the sealing device 21 are attached, in combination, simultaneously to the gap between the outer race 8 and the inner race 6. By pressing the mounting jig 50 from the inboard side to the outboard side, as indicated by the arrow of the phantom line, the circular annular portion 52 of the mounting jig 50 presses the cylindrical part 24A of the first sealing member 24, and thus the entirety of the first sealing member 24 toward the outboard side, and the circular annular portion 54 of the mounting jig 50 presses the flange 35 of the second sealing member 26, and thus the entirety of the second sealing member 26 toward the outboard side.

The outer diameter DL of the labyrinth lip 40 is less than the outer diameter DO of the cylindrical part 24A of the first sealing member 24 and equal to or less than the inner diameter DI of the cylindrical part 24A. The inner diameter of the circular annular portion 52 of the mounting jig 50 is greater than or equal to the inner diameter DI of the cylindrical part 24A. Therefore, when mounting the cylindrical part 24A of the first sealing member 24 to the outer race 8 with use of the mounting jig 50, the labyrinth lip 40 does not get in the way and the cylindrical part 24A can be easily pushed into the outer race 8.

Figure 3:
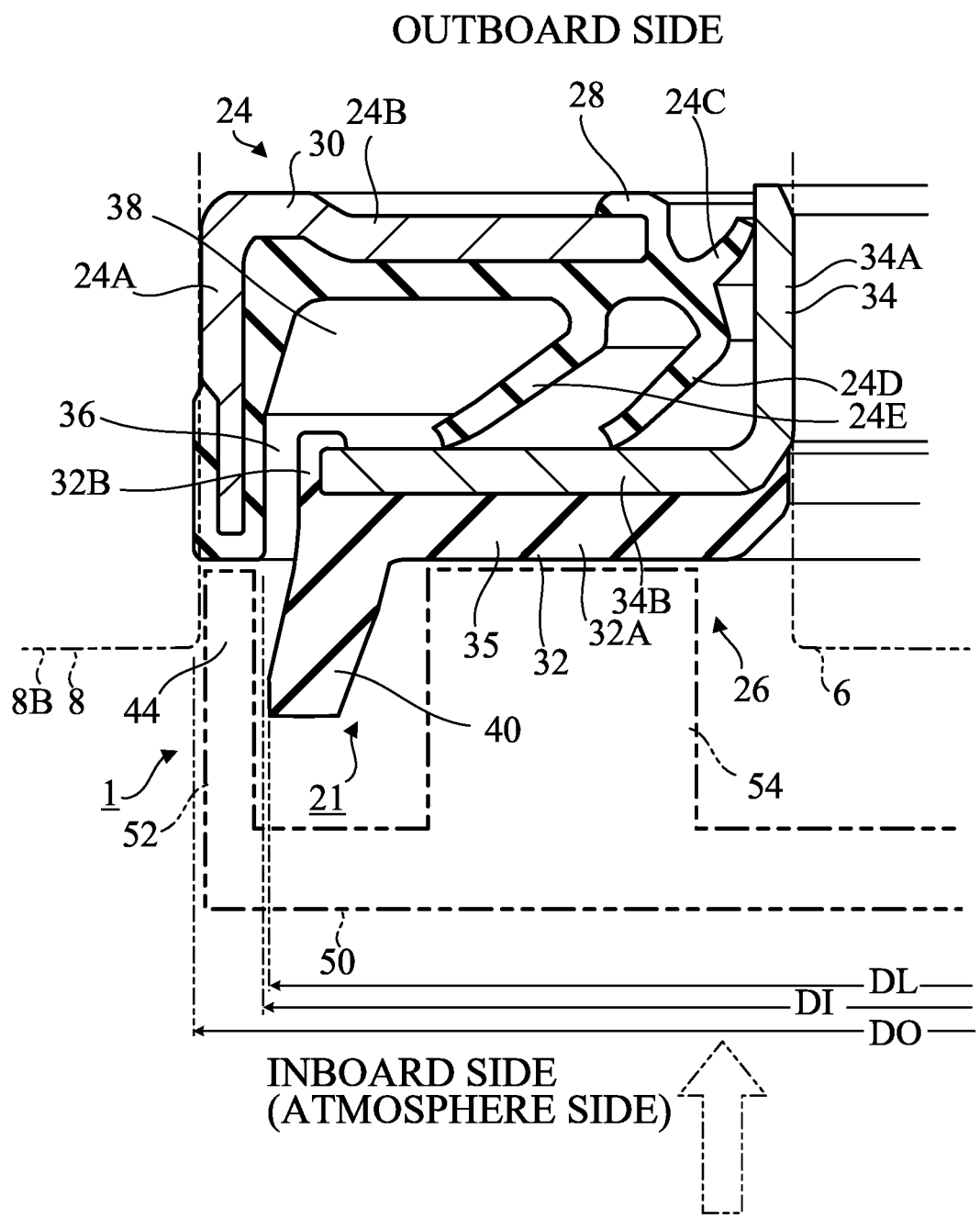
FIG. 3 is a partial cross-sectional view of a sealing device according to a modification of the embodiment of the present invention.

FIG. 3 is a partial cross-sectional view of a sealing device according to a modification of the embodiment. In this modification, the labyrinth lip 42 is not formed, and the shape of the labyrinth lip 40 is different from that of the labyrinth lip 40 in FIG. 2.

In this modification, the first clearance 36 is also covered with the labyrinth lip 40, which prevents the ingress of foreign matter into the space 38. Since the second clearance 44 is provided between the labyrinth lip 40 and the outer race 8, even if foreign matter enters the first clearance 36 and/or the space 38, the foreign matter will be discharged through the second clearance 44.

The outer diameter DL of the labyrinth lip 40 is less than the outer diameter DO of the cylindrical part 24A of the first sealing member 24 and equal to or less than the inner diameter DI of the cylindrical part 24A. Therefore, when mounting the cylindrical part 24A of the first sealing member 24 to the outer race 8 with use of the mounting jig 50, the labyrinth lip 40 does not get in the way and the cylindrical part 24A can be easily pushed into the outer race 8.

Figure 4:
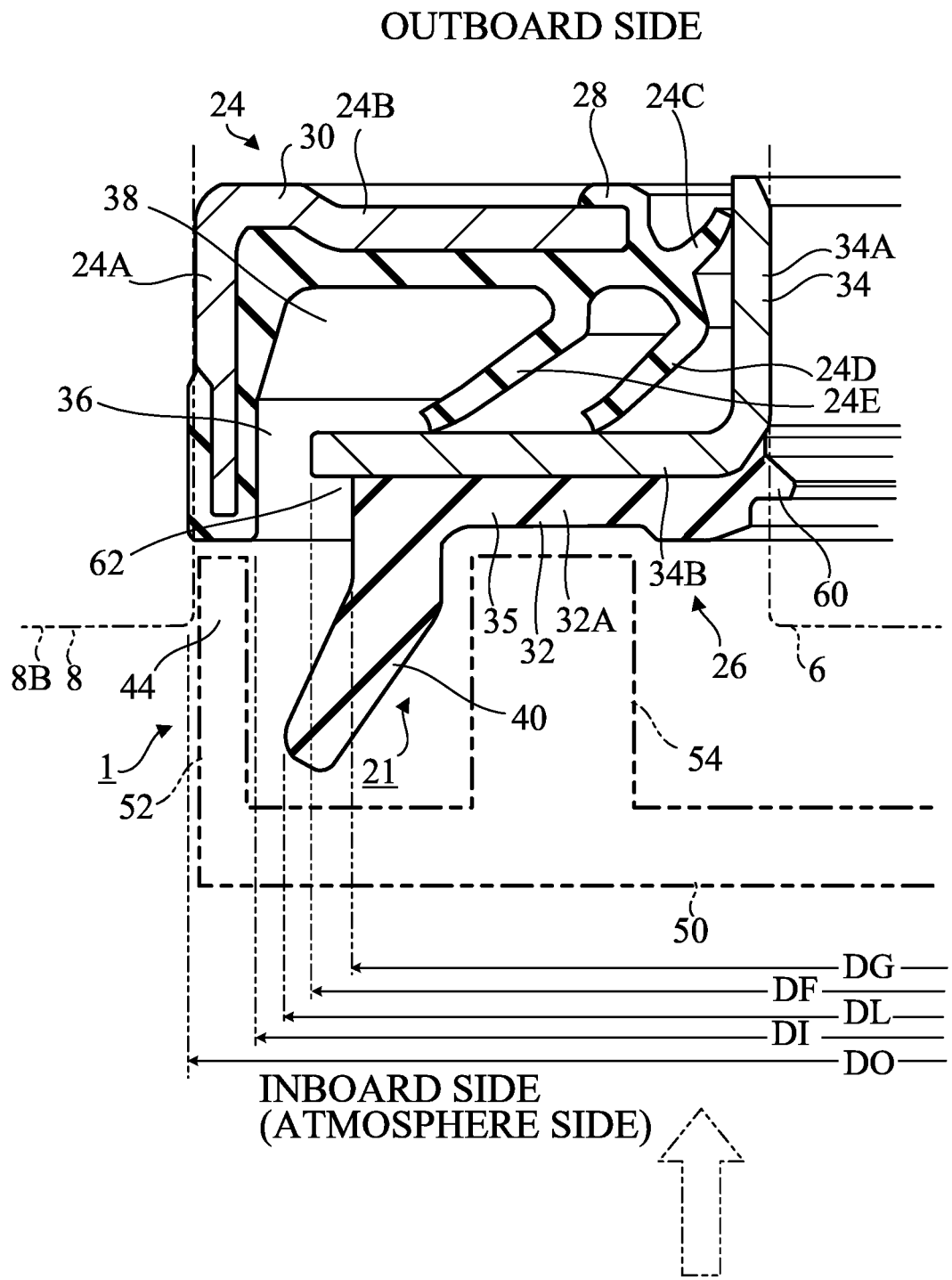
FIG. 4 is a partial cross-sectional view of a sealing device according to another modification of the embodiment of the present invention.

FIG. 4 is a partial cross-sectional view of a sealing device according to another modification of the embodiment, in which the labyrinth lip 42 is not formed and the shape and position of the labyrinth lip 40 are different from those of the labyrinth lip 40 in FIG. 2.

In this modification, the first clearance 36 is also covered with the labyrinth lip 40, which prevents the ingress of foreign matter into the space 38. Since the second clearance 44 is provided between the labyrinth lip 40 and the outer race 8, even if foreign matter enters the first clearance 36 and/or the space 38, the foreign matter will be discharged through the second clearance 44.

The outer diameter DL of the labyrinth lip 40 is less than the outer diameter DO of the cylindrical part 24A of the first sealing member 24 and equal to or less than the inner diameter DI of the cylindrical part 24A. Therefore, when mounting the cylindrical part 24A of the first sealing member 24 to the outer race 8 with use of the mounting jig 50, the labyrinth lip 40 does not get in the way and the cylindrical part 24A can be easily pushed into the outer race 8.

In this modification, an annular protrusion 60 is formed on the inner peripheral surface of the elastic portion 32A of the flange 35. The annular protrusion 60 protrudes radially inward from the sleeve 34A. Once the end of inner race 6 is fitted into sleeve 34A, the annular protrusion 60 is compressed by the outer peripheral surface of the end of inner race 6 to prevent or reduce penetration of foreign matter between the end of inner race 6 and sleeve 34A.

In this modification, the flange 35 does not have an elastic portion 32B that covers the outer peripheral surface of rigid portion 34B. A circumferential groove 62 is formed on the outer peripheral surface of the boundary portion between the labyrinth lip 40 and the flange 35. In this modification, the outer peripheral surface of the elastic portion 32A of the flange 35 forms the bottom surface of the circumferential groove 62, and the rigid portion 34B of the flange 35 forms a partition wall of the circumferential groove 62.

Thus, the circumferential groove 62 is disposed on the atmosphere side (i.e., outside the space 38 between the annular part 24B and the flange 35) for the first clearance 36. External foreign matter that is on the point of entering the first clearance 36, but is blocked by the outer edge of the rigid portion 34B of the flange 35, will enter the circumferential groove 62. Since the circumferential groove 62 is formed on the outer peripheral surface of the boundary portion between the labyrinth lip 40 and the flange 35, foreign matter that has entered the circumferential groove 62 is restricted from entering the space 38 through the first clearance 36 by means of the rigid portion 34B of the flange 35.

Figure 5:
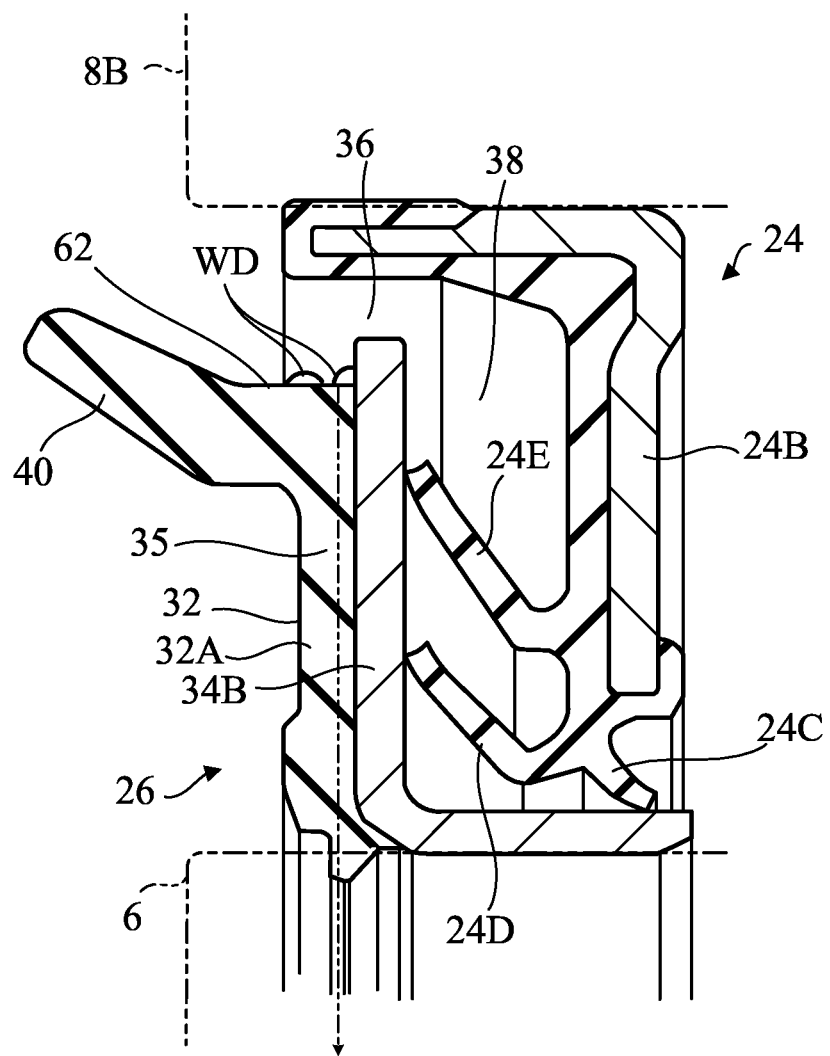
FIG. 5 is a partial cross-sectional view of the sealing device of FIG. 4 in a different orientation.

FIG. 5 is a partial cross-sectional view of the sealing device of FIG. 4 in a different orientation. FIG. 5 shows that water drops WD, which have been prevented from entering the space 38 by the rigid portion 34B of the flange 35, have entered the circumferential groove 62. Since the flange 35 is circular and annular, the water drops WD that have entered the circumferential groove 62 fell down through the outer peripheral surface of the elastic portion 32A of the flange 35, as shown by the arrow of the phantom line. Thereafter, they do not enter the space 38. Although the water drops WD may contain dust, damage to the axial lips 24D and 24E is prevented or reduced by preventing the water drops WD from entering the space 38.

Figure 6:
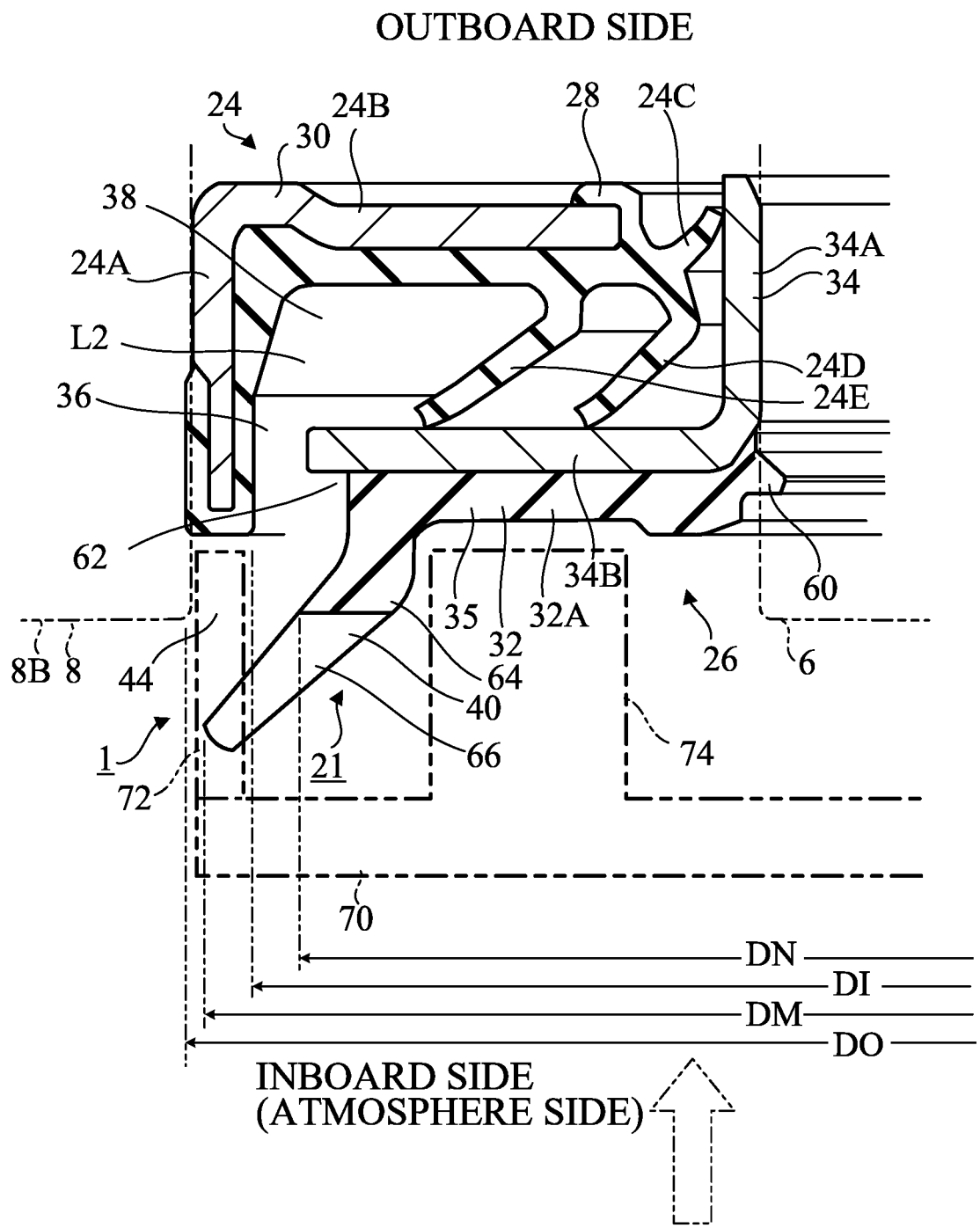
FIG. 6 is a partial cross-sectional view of a sealing device according to another modification of the embodiment of the present invention.

FIG. 6 is a partial cross-sectional view of a sealing device according to another modification of the embodiment. This modification is a variant of the modification in FIG. 4. In this modification, the labyrinth lip 40 includes multiple distal portions 66 that are disposed intermittently in a circumferential direction.

Figure 7:
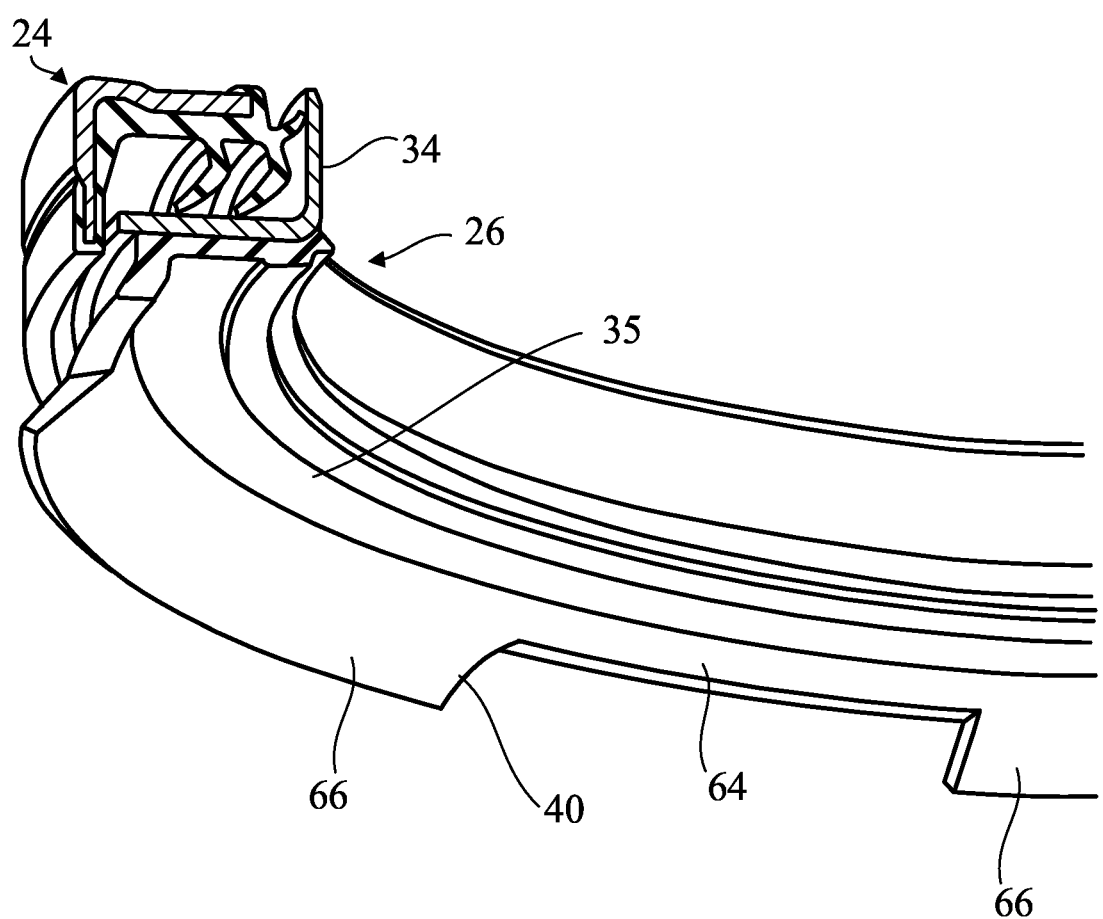
FIG. 7 is a perspective view of the sealing device of FIG. 6 in which a part is cutaway.

More specifically, in this modification, as shown in FIG. 7, the labyrinth lip 40 has an annular proximal portion 64 and multiple distal portions 66 that are intermittently provided. The proximal portion 64 is a truncated-cone shaped ring that extends radially outward and toward the inboard side (atmosphere side) from the flange 35 of the second sealing member 26 (especially, the elastic portions 32A and 32B). The multiple distal portions 66 extend radially outward and toward the inboard side (atmosphere side) from the proximal portion 64, and are spaced apart from one another in a circumferential direction. The inner peripheral surfaces of the distal portions 66 are flush with the inner peripheral surface of proximal portion 64, and the outer peripheral surfaces of distal portions 66 are flush with the outer peripheral surface of proximal portion 64.

As shown in FIG. 6, the outer diameter DN of the proximal portion 64 of the labyrinth lip 40 is less than the inner diameter DI of the cylindrical part 24A of the first sealing member 24. The diameter DM of a circle defined by the distal portions 66 of the labyrinth lip 40 is less than the outer diameter DO of the cylindrical part 24A and greater than the inner diameter DI of the cylindrical part 24A.

According to this modification, since the diameter DM of a circle defined by the distal portions of the labyrinth lip 40 is greater than the outer diameter DI of the first clearance 36, ingress of foreign matter into the space 38 between annular part 24B and flange 35 through the first clearance 36 may further be reduced.

The sealing device 21 is mounted to the gap between the outer race 8 and the inner race 6 by, for example, a mounting jig 70. The arrow depicted by the phantom line in the figure indicates the direction of movement of the mounting jig 70.

The mounting jig 70 is formed of a metal such as a steel, and has multiple projections 72 intermittently formed and a circular annular portion 74. The end surfaces of the projections 72 can be brought into contact with the end surface of the cylindrical part 24A of the first sealing member 24, and the end surface of the circular annular portion 74 can be brought into contact with the elastic portion 32A of the flange 35 of the second sealing member 26. The projections 72 are spaced apart from each other in a circumferential direction.

By means of the mounting jig 70, the first sealing member 24 and the second sealing member 26 of the sealing device 21 are attached, in combination, simultaneously to the gap between the outer race 8 and the inner race 6. By pressing the mounting jig 70 from the inboard side to the outboard side, as indicated by the arrow of the phantom line, the projections 72 of the mounting jig 70 press the cylindrical part 24A of the first sealing member 24, and thus the entirety of the first sealing member 26 toward the outboard side, and the circular annular portion 74 of the mounting jig 70 presses the flange 35 of the second sealing member, and thus the entirety of the second sealing member 26, toward the outboard side.

The diameter DM of a circle defined by the distal portions 66 of the labyrinth lip 40 is greater than the inner diameter DI of the cylindrical part 24A of the first sealing member 24.

However, the distal portions 66 are intermittently provided in a circumferential direction, and when pressing on the cylindrical part 24A of the first sealing member 24, the projections 72 are located between the intermittently arranged distal portions 66, so that the distal portions 66 do not get in the way. Since the outer diameter DN of the proximal portion 64 of the labyrinth lip 40 is less than the inner diameter DI of the cylindrical part 24A of the first sealing member 24, the proximal portion 64 is also not obstructive. Therefore, when mounting the cylindrical part 24A of the first sealing member 24 to the outer race 8 with use of the mounting jig 70, the labyrinth lip 40 does not get in the way and the cylindrical part 24A can be easily pushed into the outer race 8.

Figure 8:
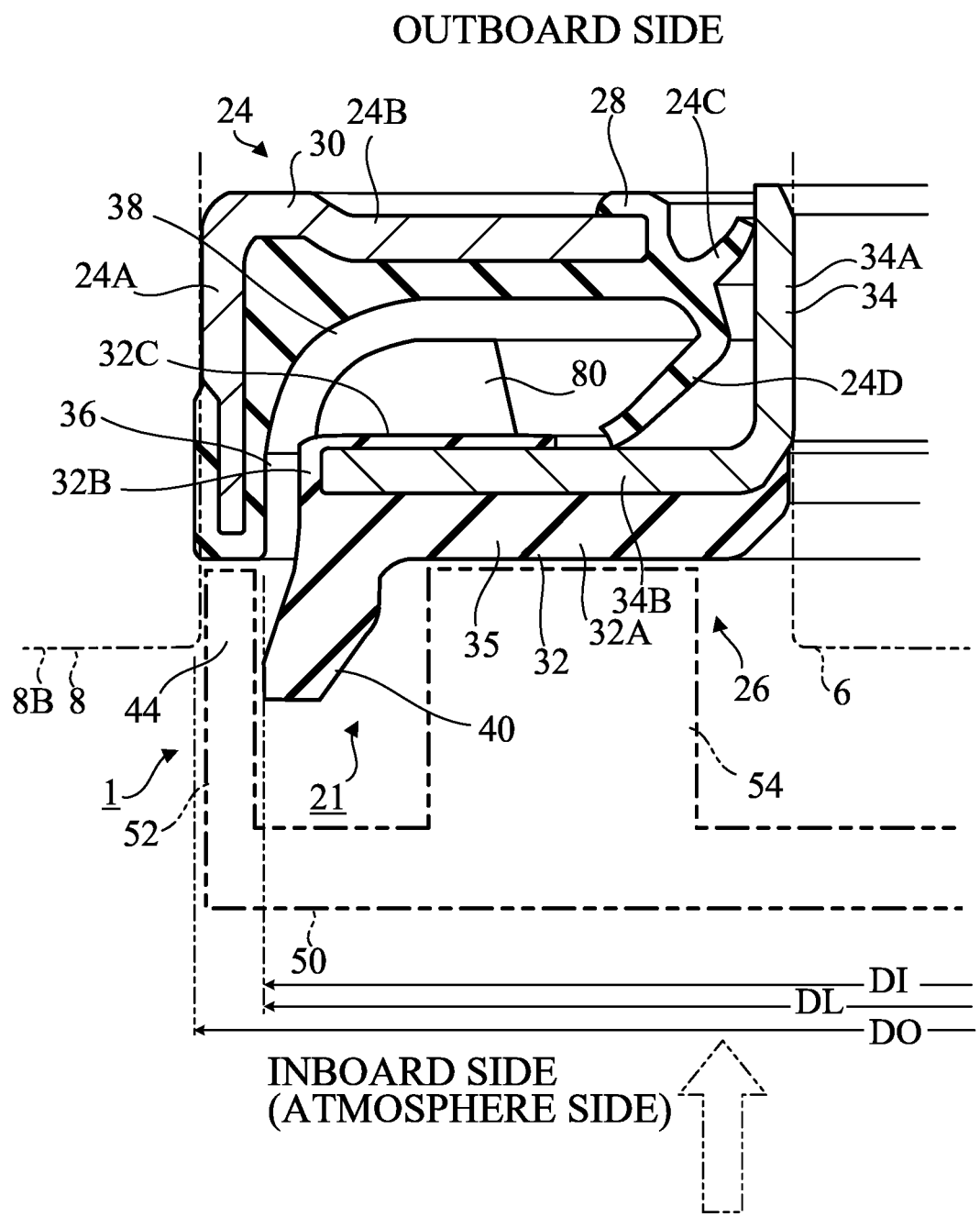
FIG. 8 is a partial cross-sectional view of a sealing device according to another modification of the embodiment of the present invention.

FIG. 8 is a partial cross-sectional view of a sealing device according to another modification of the embodiment. In this modification, the axial lip 24E is not provided. In this modification, the second sealing member 26 has multiple water discharge protrusions (fins) 80 located in the space 38. The water discharge protrusions 80 protrudes from the flange 35 toward the annular part 24B of the first sealing member 24. The water discharge protrusions 40 are of the same shape and size, and are arranged at equiangular intervals in a circumferential direction.

In this modification, the flange 35 further includes an elastic portion 32C, which is fixedly attached to a portion (outer portion) of a surface (outboard side surface) of the sleeve portion 34A of the rigid portion 34B. Multiple water discharge protrusions 80 are integrally attached to the elastic portion 32C of the flange portion 35. In other words, the water discharge protrusions 80 comprise portions of the elastic ring 32.

In this modification, together with relative rotation of the inner race 6 and the outer race 8, the water in the space 38 flows along the water discharge protrusions 80 and is rapidly discharged from the space 38 through the first clearance 36 and the second clearance 44. Accordingly, the sealing device 21 provides a superior protective effect for the hub bearing 1, which is to be sealed, against water. For the sealing device 21 itself, deterioration, which is accelerated in the presence of water (including muddy water or salt water), is reduced.

Figure 9:
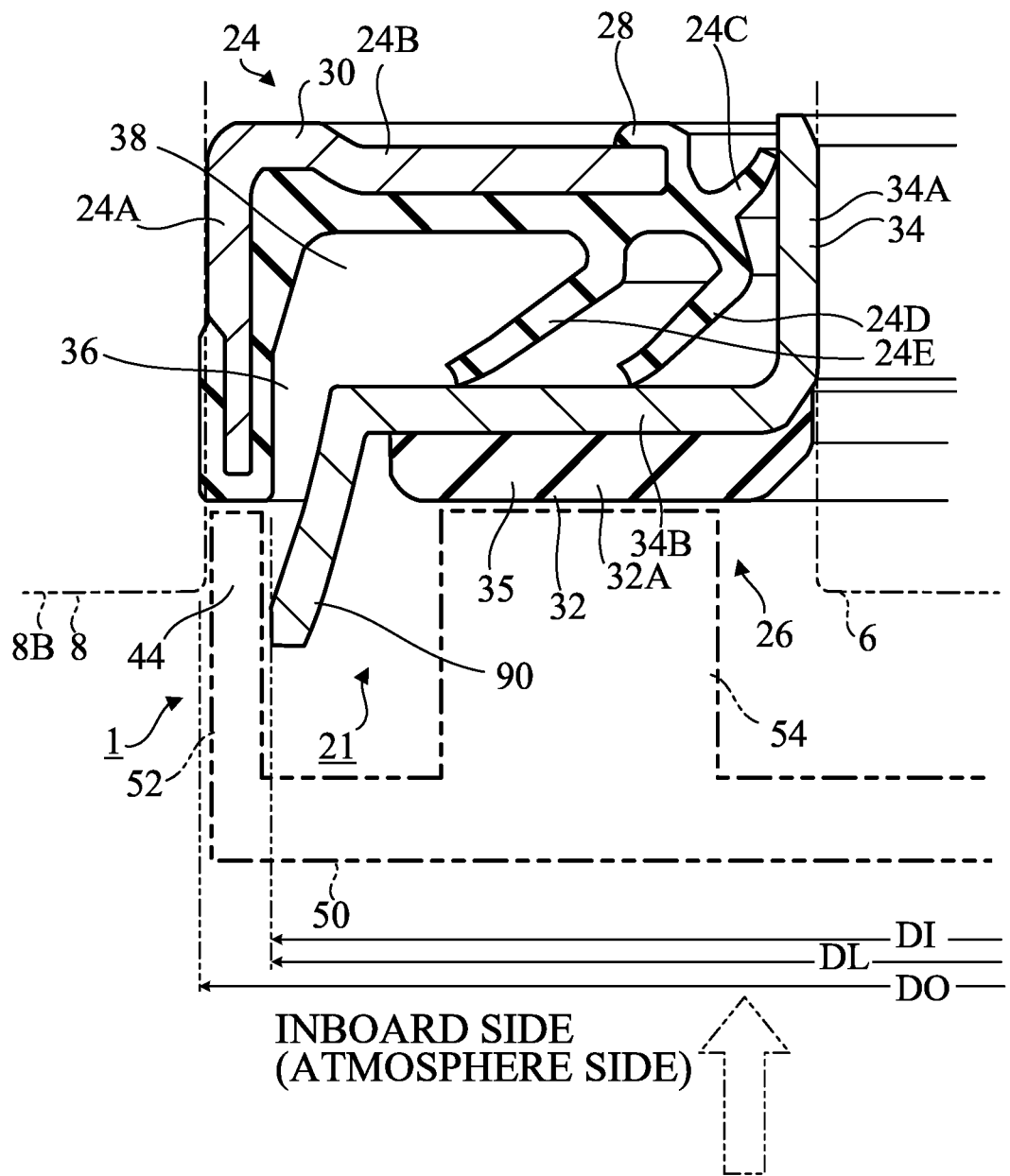
FIG. 9 is a partial cross-sectional view of a sealing device according to another modification of the embodiment of the present invention.

FIG. 9 is a partial cross-sectional view of a sealing device according to another modification of the embodiment. In this modification, instead of the labyrinth lip 40 made of an elastic material, there is provided a labyrinth lip 90 made of a rigid material such as a metal.

The labyrinth lip 90 is a truncated-cone shaped ring that extends radially outward and toward the inboard side (atmosphere side) from the flange 35 (especially, the rigid portion 34B) of the second sealing member 26. The labyrinth lip 90 extends more toward the inboard side than the cylindrical part 24A of the first sealing member 24, and an annular second clearance 44 is provided between the labyrinth lip 90 and the outer race 8. The second clearance 44 communicates with the first clearance. The second clearance 44 is located radial outside the first clearance 36. In other words, the labyrinth lip 90 covers the first clearance 36 at least partially.

The labyrinth lip 90 is integrally attached to the rigid portion 34B of the flange 35. In other words, the labyrinth lip 90 is a part of the rigid ring 34. Therefore, the labyrinth lip 90 is made of the same material as the rigid ring 34, i.e., a metal, and has superior durability against impact of hard foreign matter and a superior wear resistance.

In this modification, the first clearance 36 is also covered with the labyrinth lip 90, which prevents foreign matter from entering the space 38. Since the second clearance 44 is provided between the labyrinth lip 90 and the outer race 8, even if foreign matter enters the first clearance 36 and/or the space 38, the foreign matter will be discharged through the second clearance 44.

The outer diameter DL of the labyrinth lip 90 is less than the outer diameter DO of the cylindrical part 24A of the first sealing member 24 and equal to or less than the inner diameter DI of the cylindrical part 24A of the cylindrical part 24A. Therefore, when mounting the cylindrical part 24A of the first sealing member 24 to the outer race 8 with use of the mounting jig 50, the labyrinth lip 90 does not get in the way and the cylindrical part 24A can be easily pushed into the outer race 8.

Other Modifications

The present invention has been shown and described with reference to preferred embodiments thereof. However, it will be understood by those skilled in the art that various changes in form and detail may be made without departing from the scope of the invention as defined by the claims. Such variations, alterations, and modifications are intended to be encompassed in the scope of the present invention.

For example, in the above-described embodiment, the hub 4 and the inner race 6, which are inner members, are rotatable members, while the outer race 8, which is an outer member, is a stationary member. However, the present invention is not limited thereto, and may be configured such that multiple sealed members rotate relative to each other. For example, inner members may be stationary while an outer member may be rotatable, or all of the members may be rotatable.

The present invention is not limited to sealing the hub bearing 1. For example, the sealing device or the sealing structure according to the present invention may be applied to a differential gear mechanism or other power transmission mechanism of an automotive vehicle, to a bearing or other support mechanism for a drive shaft of an automotive vehicle, or to a bearing or other support mechanism of a rotary shaft of a pump.

Although the rigid ring 30 of the sealing device 21 in the embodiment and modifications consists of a single component, in place of the rigid ring 30, there may be employed multiple rigid rings that are provided radially apart from each other.

Although the sealing device 21 in the embodiment and modifications includes at least one axial lip, the axial lip may be omitted.

The labyrinth lip 40 made of an elastic material may be formed of a resin material that does not contain a metal powder and/or a ceramic powder, or an elastomer material that does not contain a metal powder and/or a ceramic powder.

Featured of the embodiment and the modifications may be combined as long as no contradiction arises thereby.

Aspects of the present invention are also set out in the following numbered clauses:

Clause 1. A sealing device adapted to be disposed between an inner member and an outer member that rotate relative to each other, and adapted to act to seal a gap between the inner member and the outer member, the sealing device including:

a first sealing member including a cylindrical part adapted to be mounted to the outer member, and an annular part that extends radially inward from the cylindrical part toward the inner member; and a second sealing member including a sleeve adapted to be mounted to the inner member, and a flange that extends radially outward from the sleeve, the flange facing the annular part of the first sealing member, the first sealing member further including at least one lip made of an elastic material that extends toward the flange of the second sealing member, an annular first clearance being provided between the flange and the cylindrical part of the first sealing member, the second sealing member further including a labyrinth lip extending from the flange radially outward and extending toward the atmosphere side more than the cylindrical part of the first sealing member, a second clearance being provided between the labyrinth lip and the outer member, the second clearance being radially outside the first clearance and communicating with the first clearance.

Clause 2. The sealing device according to clause 1, wherein a an outer diameter of the labyrinth lip is equal to or less than the inner diameter of the cylindrical part of the first sealing member.

According to this clause, since the outer diameter of the labyrinth lip is equal to or less than the inner diameter of the cylindrical part of the first sealing member, when the cylindrical part of the first sealing member is mounted to the outer member, the cylindrical part can be easily pushed into the outer member.

Clause 3. The sealing device according to clause 1, wherein the labyrinth lip includes a proximal portion extending from the flange and multiple distal portions extending from the proximal portion, the distal portions being disposed intermittently in a circumferential direction, an outer diameter of the proximal portion of the labyrinth lip being less than an inner diameter of the cylindrical part of the first sealing member, a diameter of a circle defined by the distal portions of the labyrinth lip being greater than an inner diameter of the cylindrical part.

According to this clause, since the diameter of a circle defined by the distal portions of the labyrinth lip is greater than the size of the first clearance, ingress of foreign matter into the space between annular part and flange through the first clearance may further be reduced. On the other hand, since the outer diameter of the proximal portion of the labyrinth lip is less than the inner diameter of the cylindrical part of the first sealing member, when the cylindrical part of the first sealing member is mounted to the outer member, the cylindrical part can be easily pushed into the outer member.

Clause 4. The sealing device according to any one of clauses 1-3, wherein a circumferential groove is formed on an outer peripheral surface of a boundary portion between the labyrinth lip and the flange.

According to this clause, the circumferential groove is disposed on the atmosphere side (i.e., outside the space between the annular part and the flange) for the first clearance. External foreign matter that is on the point of entering the first clearance, but is blocked by the outer edge of the flange, will enter the circumferential groove. Since the circumferential groove is formed on the outer peripheral surface of the boundary portion between the labyrinth lip and the flange, foreign matter that has entered the circumferential groove is restricted from entering the space through the first clearance by means of the flange.

Clause 5. The sealing device according to any one of clauses 1-4, wherein the flange includes a rigid portion made of a rigid material and an elastic portion made of an elastic material that is adhered to a surface of the rigid portion opposite to the sleeve, the labyrinth lip being integrally formed with the elastic portion.

Clause 6. The sealing device according to clause 5, wherein the elastic portion of the flange is made of a resin material containing a metal powder and/or a ceramic powder, or an elastomer material containing a metal powder and/or a ceramic powder According to this clause, the labyrinth lip has superior durability against impact of hard foreign matter and a superior wear resistance.

Clause 7. The sealing device according to clause 1, wherein the flange includes a portion made of a rigid material, the labyrinth lip being integrally formed with the portion made of the rigid material.

According to this clause, the labyrinth lip has superior durability against impact of hard foreign matter and a superior wear resistance.

REFERENCE SYMBOLS

1: Hub bearing
6: Inner race (inner member)
8: Outer race (outer member)
21: Sealing device
24: First sealing member
26: Second sealing member
28: Elastic ring
30: Rigid ring
24A: Cylindrical part
24B: Annular part
24C: Radial lip
24D, 24E: Axial lip
32: Elastic ring
34: Rigid ring
34A: Sleeve
34B: Flange (rigid portion of flange 35)
35: Flange
32A: Elastic portion of flange 35
32B: Elastic portion of flange 35
36: First clearance
38: Space
40: Labyrinth lip
44: Second clearance
50, 70: Mounting jig
62: Circumferential groove
64: Proximal portion
66: Distal portion
90: Labyrinth lip

The invention claimed is:

1. A sealing device adapted to be disposed between an inner member and an outer member that rotate relative to each other, and adapted to act to seal a gap between the inner member and the outer member, the sealing device comprising:

a first sealing member comprising a cylindrical part adapted to be mounted to the outer member, and an annular part that extends radially inward from the cylindrical part toward the inner member; and a second sealing member comprising a sleeve adapted to be mounted to the inner member, and a flange that extends radially outward from the sleeve, the flange facing the annular part of the first sealing member, the first sealing member further comprising at least one lip made of an elastic material that extends toward the flange of the second sealing member, an annular first clearance being provided radially between an end of the flange and a region of the cylindrical part of the first sealing member that surrounds the end of the flange, the second sealing member further comprising a labyrinth lip extending from the flange radially outward and extending toward the atmosphere side more than the cylindrical part of the first sealing member, a second clearance facing an end of the cylindrical part in an axial direction, the second clearance configured to be positioned radially between the labyrinth lip and the outer member, the second clearance being radially and axially outside the first clearance and communicating with the first clearance.

2. The sealing device according to claim 1, wherein an outer diameter of the labyrinth lip is equal to or less than an inner diameter of the cylindrical part of the first sealing member.

3. The sealing device according to claim 1, wherein the labyrinth lip comprises a proximal portion extending from the flange and multiple distal portions extending from the proximal portion, the distal portions being disposed intermittently in a circumferential direction, an outer diameter of the proximal portion of the labyrinth lip being less than an inner diameter of the cylindrical part of the first sealing member, a diameter of a circle defined by the distal portions of the labyrinth lip being greater than the inner diameter of the cylindrical part.

4. The sealing device according claim 1, wherein a circumferential groove is formed on an outer peripheral surface of a boundary portion between the labyrinth lip and the flange.

5. The sealing device according to claim 1, wherein the flange comprises a rigid portion made of a rigid material and an elastic portion made of an elastic material that is adhered to a surface of the rigid portion opposite to the sleeve, the labyrinth lip being integrally formed with the elastic portion.

6. The sealing device according to claim 5, wherein the elastic portion of the flange is made of a resin material containing a metal powder and/or a ceramic powder, or an elastomer material containing a metal powder and/or a ceramic powder.

7. The sealing device according to claim 1, wherein the flange comprises a portion made of a rigid material, the labyrinth lip being integrally formed with the portion made of the rigid material.

* * * * *